(12) United States Patent
Kanevsky et al.

(10) Patent No.: US 8,185,480 B2
(45) Date of Patent: May 22, 2012

(54) SYSTEM AND METHOD FOR OPTIMIZING PATTERN RECOGNITION OF NON-GAUSSIAN PARAMETERS

(75) Inventors: Dimitri Kanevsky, Ossining, NY (US); David Nahamoo, Great Neck, NY (US); Daniel Povey, Greenwich, CT (US); Bhuvana Ramabhadran, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 12/061,023

(22) Filed: Apr. 2, 2008

(65) Prior Publication Data

US 2009/0254496 A1    Oct. 8, 2009

(51) Int. Cl.
*G06F 15/18* (2006.01)
(52) U.S. Cl. .................................................. 706/12
(58) Field of Classification Search .................. 706/12
See application file for complete search history.

(56) References Cited

U.S. PATENT DOCUMENTS

| | | | |
|---|---|---|---|
| 5,724,487 | A | 3/1998 | Streit |
| 6,374,216 | B1 | 4/2002 | Micchelli et al. |
| 6,804,648 | B1 | 10/2004 | Basu et al. |
| 7,139,703 | B2 * | 11/2006 | Acero et al. ............. 704/228 |
| 2008/0091424 | A1 * | 4/2008 | He et al. .................. 704/240 |

FOREIGN PATENT DOCUMENTS

WO   WO 2007/112749   10/2007

OTHER PUBLICATIONS

"Maximum a Posteriori Estimation for Multivariate Gaussian Mixture Observations of Markov Chains", Jean-Luc Gauvain, Chin-Hui Lee, IEEE Transactions on Speech and Audio Processing, vol. 2, No. 2 Apr. 1994, pp. 291-298.*
"Distant-talking Continuous Speech Recognition based on a novel Reverberation Model in the Feature Domain", A. Sehr, M. Zeller, W. Kellermann, Interspeech 2006, Sep. 17-21 Pittsburgh, PA, pp. 1-4.*
"High-Performance Connected Digit Recognition Using Maximum Mutual Information Estimation", Y. Normandin, R. Cardin, R. De Mori, Speech and Audio Processing, IEEE Transactions on, Issue 2, Apr. 1994, pp. 299-311.*
"Feature Space Gaussianization", G. Saon, S. Dharanipragada, D. Povey, Acoustics, Speech, and Signal Processing, 2004, May 17-21, 2004, pp. I-329-332, vol. 1.*
D. Kanevsky, "Extended Baum transformations for general functions", in Proc. ICASSP, 2004.

* cited by examiner

*Primary Examiner* — Jeffrey A Gaffin
*Assistant Examiner* — Mai T Tran
(74) *Attorney, Agent, or Firm* — McGinn Intellectual Property Law Group, PLLC

(57) ABSTRACT

A method of optimizing a function of a parameter includes associating, with an objective function for initial value of parameters, an auxiliary function of parameters that could be optimized computationally more efficiently than an original objective function, obtaining parameters that are optimum for the auxiliary function, obtaining updated parameters by taking a weighted sum of the optimum of the auxiliary function and initial model parameters.

16 Claims, 6 Drawing Sheets

SYSTEM AND METHOD FOR OPTIMIZING PATTERN RECOGNITION OF NON-GAUSSIAN PARAMETERS

BACKGROUND OF THE INVENTION

1. Field of the Invention

The present invention generally relates to a method and apparatus for pattern recognition, and more particularly to a method and apparatus for estimating parameters in statistical models that represent patterns using optimization criteria.

2. Description of the Related Art

Conventional pattern recognition algorithms fall short in cases that involve huge data sources or large number of modeling parameters, such as large vocabulary continuous speech recognition or translation, enterprise applications, such as data mining and business intelligence, weather prediction, processing satellite data to predict locations of traffic jams, prediction of trends in financial markets, etc. Pattern recognition requires estimating parameters in statistical models that represent patterns through some optimization criteria (e.g., Maximum Likelihood (ML) or Maximum Mutual Information Estimation (MMI) function with Gaussian mixture parameters). The term "huge data" pattern recognition denotes a process that operates with a large number of modeling parameters (order of several millions) or process large data sets (e.g., several hundred millions of words in textual corpuses). Pattern recognition presents challenging optimization requirements that are not fully resolved by conventional optimization techniques, for the following reasons.

First, optimization methods that involve the Hessian matrix are computationally inefficient when the data size or number of model parameters is very large (e.g., several million parameters).

Second, optimization criteria for estimating parameters in pattern recognition, in general, are far from perfect. For example, maximum likelihood criteria usually do not work well if the training data to estimate the parameters in models do not represent all possible variations in patterns. Accordingly, certain conventional techniques have introduced discrimination criteria, such as Maximum Mutual Information Estimation (MMI), for training. The MMI discrimination criteria can be efficiently optimized via Extended-Baum-Welch (EBW) transformations for discrete probability parameters and Gaussian parameters Third, a conventional optimization technique exists that uses expectation-maximization (EM) estimation methodology. This technique involves an iterative process in which an original objective function is replaced with a computed auxiliary function (E-step) at each iterative step. After this auxiliary function computed it is optimized (M-step). Usually this optimization process can be represented in a closed form solution. This is applicable only to narrow classes of criteria as the maximum likelihood criteria. This process is important as a modeling/estimation statistical tool since it allows a user to make assumptions about incomplete observed data (namely, introduce a hidden data and a latent variable that describes this hidden data).

Several problems, however, remain with the above conventional approaches.

First, fast optimization can easily lead to overtraining and degradation of pattern recognition accuracy.

Second, there exist processes that are not modeled as Gaussian and, therefore, EBW transformations could not be used to optimize the MMI discriminative criteria.

Third, the EM concept as a modeling tool is applicable only to ML type of functions and is not applicable to general discrimination functions of non-Gaussians parameters. This raises a problem in creating an optimization process and generalize estimation-maximization process to estimate parameters for a large class of objective (discriminative) criteria for processes that are not modeled as Gaussians.

SUMMARY OF THE INVENTION

In view of the foregoing and other exemplary problems, drawbacks, and disadvantages of the conventional methods and structures, an exemplary feature of the present invention is to provide a method and structure in which novel optimization criteria and fast optimization methods are used, that allow modeling non-Gaussian processes and which do not lead to overtraining and degradation of pattern recognition accuracy (e.g., speech recognition, machine translation, visual analysis) pattern recognition tasks.

In a first exemplary, non-limiting aspect of the present invention, a system for optimizing a function of a parameter includes a unit that represents the parameter as a composition of modified factors and countable factors.

In a second exemplary, non-limiting aspect of the present invention, a method of optimizing a function of a parameter includes associating, with an objective function for initial value of parameters, an auxiliary function of parameters that could be optimized computationally more efficiently than an original objective function, obtaining parameters that are optimum for the auxiliary function, obtaining updated parameters by taking a weighted sum of the optimum of the auxiliary function and initial model parameters.

In a third exemplary, non-limiting aspect of the present invention, a computer-readable medium tangibly embodies a program of computer-readable instructions executable by a digital processing apparatus to perform a method of optimizing a function of a parameter, where the method includes representing the parameter as a composition of modified factors and countable factors.

Accordingly, the invention may extend the power of EM modeling to a larger class of discriminative criteria and to non-Gaussian process, thereby improving the accuracy of a pattern recognition process and the making the estimation process more efficient.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
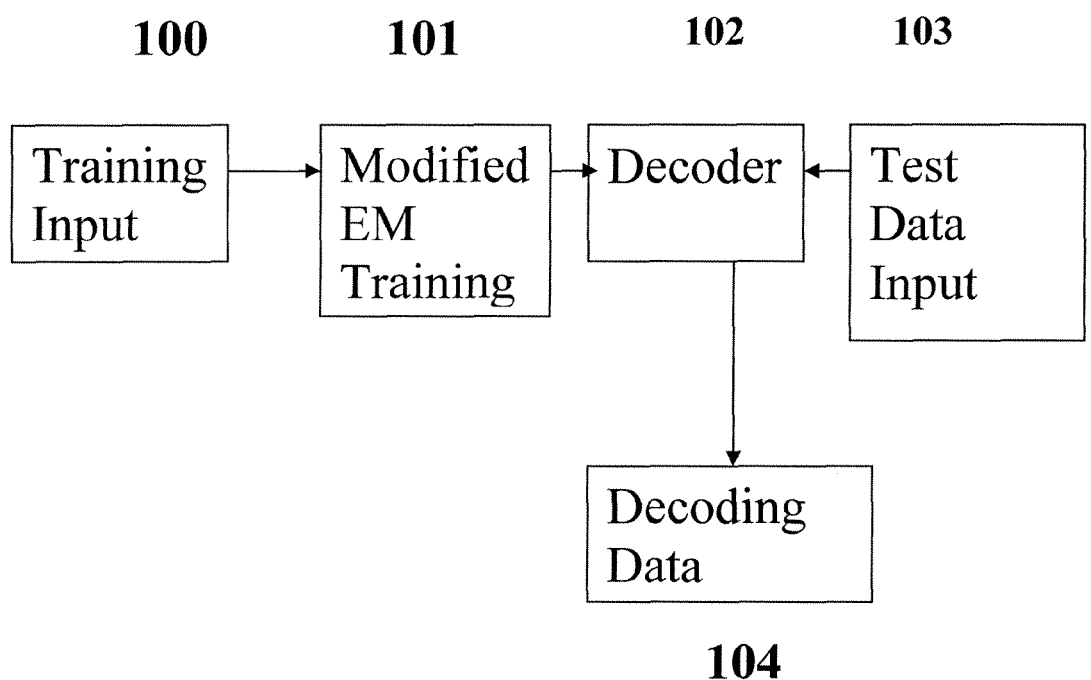
FIG. 1 illustrates a method (and system) for optimizing a function of a parameter according to an exemplary, non-limiting embodiment of the present invention.

Referring now to the drawings, and more particularly to FIGS. 1-7, there are shown exemplary embodiments of the method and structures according to the present invention.

Extended Baum-Welch (EBW) methods were developed to optimize general functions of Gaussian mixtures. In the EBW transformations $F(z)=F(z_{ij})$ is some function in variables $$z = (z_{ij}) \text{ and } c_{ij} = z_{ij}\frac{\delta}{\delta z_{ij}}F(z).$$

When considering diagonal Gaussian mixture densities, $$\text{Let } z_{ij} = \frac{1}{(2\pi)^{1/2}\sigma_j}e - (y_i - \mu_j)^2/2\sigma_j^2 \quad (1)$$

where $y_i$ is a sample of training data.

EBW transformations for diagonal mixture densities are defined as the following.

$$\mu_j = \mu_j(C) = \frac{\sum_{i \in I} c_{ij}y_i + C\mu_j}{\sum_{i \in I} c_{ij} + C} \quad (2)$$

$$\varphi^2 = \sigma_j(C)^2 = \frac{\sum_{i \in I} c_{ij}y_i^2 + C(\mu_j^2 + \sigma_j^2)}{\sum_{i \in I} c_{ij} + C} - \mu_j(C)^2 \quad (3)$$

For multivariate multidimensional Gaussian mixture densities, let $$z_{ij}=\Sigma_j 1/(2\pi|\Sigma_j|)^{n/2}\exp(-1/2(y_i-\mu_j)^T\Sigma_j^{-1}(y_i-\mu_j)) \quad (4)$$

and $y_i^t=(y_{i1}, \ldots y_{im})$ is a sample of training data. EBW transformations for multivariate Gaussian mixture densities are defined as the following:

$$\mu_j = \mu j(C) = \frac{\sum_{i \in I} c_{ij}y_i + C\mu_j}{\sum_{i \in I} c_{ij} + C} \quad (5)$$

$$\Sigma_j = \Sigma_j(C) = \frac{\sum_{i \in I} c_{ij}y_i y_i^t + C(\mu_j \mu_j^t + \Sigma_j)}{\sum_{i \in I} c_{ij} + C} - \mu_j(C)\mu_j(C)^T \quad (6)$$

These methods solve the above problems for processes that are represented as Gaussian. As indicated above, however, there is a need to have an efficient optimization algorithm also for non-Gaussian processes.

An exemplary aspect of the present invention is directed to extending EBW transformations to non-Gaussian processes.

A method in accordance with an exemplary aspect of the present invention is described in a general form as follows.

First, an optimized model is represented as a mixture of an initial model and an updated model.

$$\text{Let } F=F(X,M(\Theta)) \quad (7)$$

be some function for data X and model $M(\Theta)=\{M_i(\Theta)\}$ that is represented like in (5), (6) by parameters of Gaussian $\Theta=\{\theta_j\}\in R^n$.

$$\text{Let } d_j F(\Theta_0, \Theta) = \sum_i M_i \frac{\delta F(M_i(\Theta_0))}{\delta M_i} \frac{\delta \log M_i(\Theta)}{\delta \theta_j}$$

This is an example of an auxiliary function associated with the original function (7).

In this auxiliary function $$M_i \frac{\delta F(M_i(\Theta_0))}{\delta M_i}$$

represents a modified factor and $$\frac{\delta \log M_i(\Theta)}{\delta \theta_j}$$

represents a functional factor. If M

Let $\Theta=\{\theta_{ij}\}$ be defined from:

$$d_j F(\Theta_0,\Theta)=0 \quad (8)$$

$$\text{Let } \underline{\theta}_{ij}(\alpha_{ij})=\theta_{ij}(1-\alpha_{ij})+\alpha_{ij}\underline{\theta}_{ij} \quad (9)$$

This is the optimization step. Substituting recursively $\Theta_0=\Theta=\{\underline{\theta}_{ij}(\alpha_{ij})\}$ in (7) and solving (8) represents a new optimization process. This method is different from the gradient approach in which parameters are computed along a gradient $d_jF$ with a step (e.g., $(\theta_j=\theta_i+\alpha_i*d_jF)$). The equation (8) has a closed form solution when $M(\Theta)$ has a Gaussian representation (1) or (4). If $M(\Theta)$ has a Gaussian representation (1) or (4) then close form solutions of (8) could be represented in a form that is equivalent to (3), (4) or (5), (6). For purposes of the present discussion, the equation (8) is referred to as "countable" if one of the following holds: a) it has a closed form solution, b) a solution that can be received efficiently in some way (for example, more efficiently than finding optimum points of $F(X,M(\Theta))$ in (7) via solving an equation that is received by differentiation of $F(X,M(\Theta))$ by $\Theta$). The solution of "countable" equations is referred to as a "countable" function. The function M in equation (8) is referred to as a "countable" factor if it generates the auxiliary equation (8) that is solved efficiently in some way.

The method of the present invention suggests transforming an arbitrary function with non-Gaussian parameters to a countable factor. This means that it is transformed to the form for which equation (7) has a closed form solution or can be computed more efficiently in some way (than finding optimum points of $F(X,M(\Theta))$ in (7) via solving an equation that is received by differentiation of $F(X,M(\Theta))$ by $\Theta$)). One example of how to accomplish this is to transform to an arbitrary function F(X) the function for which (8) is solved more efficiently, as follows.

Let $\Theta=\{\Theta_i\}=\{\theta_{ij}\}$ be model parameters. Without losing the generality, one can assume that $\theta_{ij}>0$ since one can represent $\theta_{ij}=u^i_j-w^i_j$, where $u^i_j>0$, $w^i_j>0$.

The method performs the following transformation:

$$\theta_{ij}=M((y_i-\mu_j)^m) \quad (10)$$

where M is any function and m=2 or m=3. F(X) is then replaced with G({$\mu_j$}) using equation (10). Then, equation (8) has a closed form solution for G of {$\mu_j$}. Representation (10) is referred to as "quasi-Gaussian" if m=2.

There are special cases for M:
1. M(z)=z
2. Any sum of "countable" functions $M_i$ is a countable function $M=\Sigma M_i$.
3. As in 2. but after summing $\Sigma M_i$. the leading term has a less degree then $M_i$. For example if $M_i$ are square functions, than M is a linear function since square terms in $M_i$ are cancelled.

4. $M(z)=N(\text{const}*\exp(-1/2z))$ \quad (11)

where N is another function and m=2. In this case, one can apply EBW transformations (2), (3) to a function F(M(z)) with $\sigma_j=1$ and $$c_{ij} = z_{ij}\frac{\delta}{\delta z_{ij}}F(M(z)).$$

Then, one can show that application of transformations (2), (3) to the function F(M(z)) for sufficiently large C increases a value of F(M(z)) and iterative applications of this update converges to a local maximum of F(M(z)). Similar concepts could be produced for transformation of model parameters in a matrix form (5), (6). One can also shown that C in (2), (3) or (5), (6) is inversely proportional to $\alpha$ in (9).

Specifically, one can find $\alpha$ adaptively using the growth transformation formula for G=F(M(z)) that is known for Gaussian processes and can be used for non-Gaussian processes when they are represented as quasi-Gaussian processes. $\alpha$ can be chosen inversely proportionally to a gradient of growth function in some power.

FIG. 1 illustrates a method (and system) in accordance with an exemplary embodiment of the present invention. A data input unit inputs training data 100, which may be stored in a database, into a training unit for training models 101. The training data can be, for example but not limited to, audio data for speech recognition processing, video data for image object recognition, biometrics data for verification/identification, textual data for machine translation, multimedia data for data mining etc. The training unit 101 performs modified Expectation-Maximization (EM) training in which models are updated on the training data 100. The modified EM training uses a novel optimization approach that is described in further detail below, with reference to FIG. 2.

Models from the training unit 101 become part of a decoder 102. The decoder 102 can be, for example but not limited to, a speech recognition system, image object recognition system, verification/identification system, machine translation system, or search engine (depending on test data input). A test data unit 103 inputs test data that corresponds to training data 100. The decoder 102 produces a decoding output (e.g., decoding data 104) that matches the input data (for example a decoded text for speech input, image objects labels for video data).

The modified EM training unit 101 optimizes a function (e.g., equation (1) discussed above). The function being optimized can be, for example, a maximum likelihood function, a maximum information function, or a conditional maximum likelihood function. The EM training unit 101 may optimize the function directly. Additionally, the training unit 101 solves an auxiliary function (2). Accordingly, through the modified EM training 101, non-Gaussian parameters are transformed into quasi-Gaussian parameters.

Figure 2:
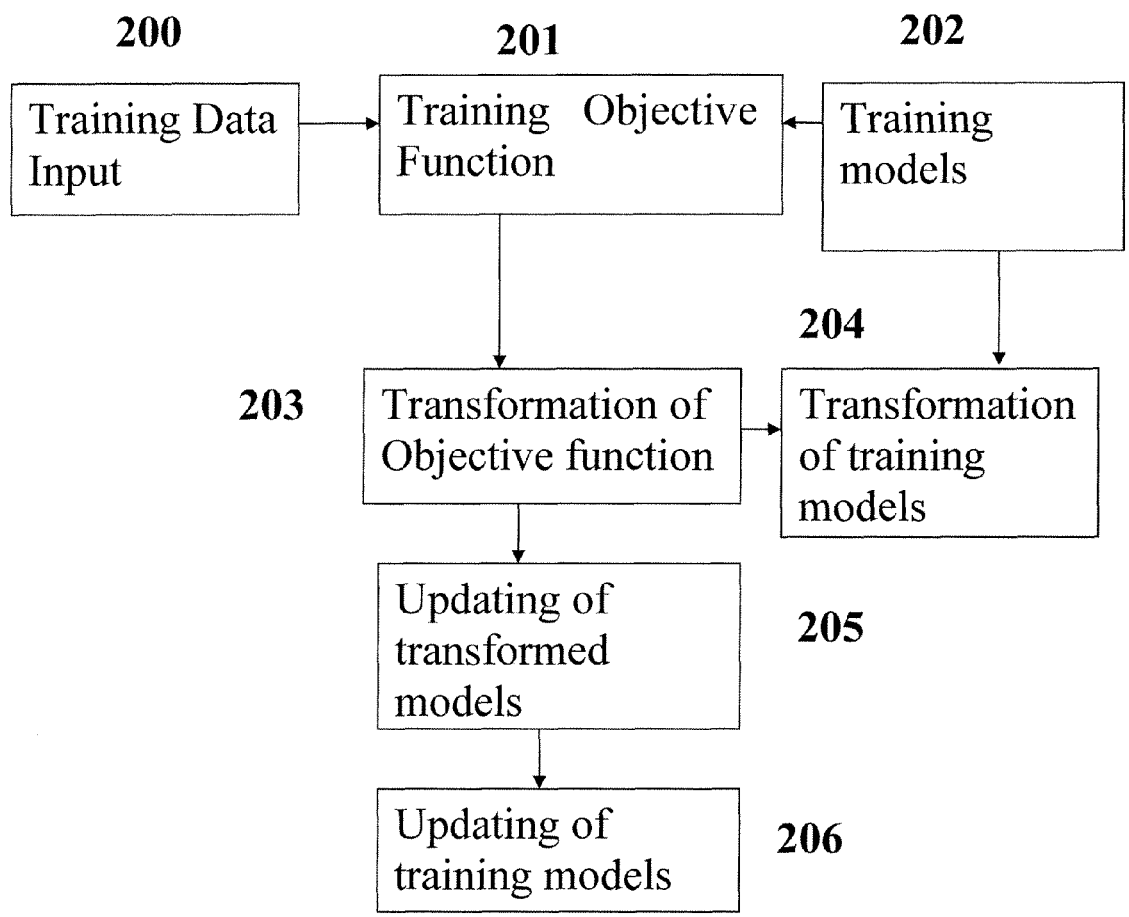
FIG. 2 more specifically illustrates the modified EM training of the exemplary, non-limiting embodiment of the present invention illustrated in FIG. 1.

FIG. 2 illustrates a detailed explanation of the function of the modified EM training unit 101, from FIG. 1. Training data is input 200 into the system (this corresponds to 100 in FIG. 1). An objective function 201 (e.g., maximum likelihood, maximum mutual information, minimum phone error, minimum class error etc.) is trained using the input data 200. A model training unit 202 trains models (e.g., non-Gaussian models) when the objective function 201 is being optimized.

In order to optimize the objective function 201 of model parameters 202, an objective transform unit 203 transforms the objective function 201 and a model transform unit 204 transforms models to create a function that can be optimized by an EM algorithm, like Gaussian functions. After the objective and the models are transformed, an update unit (205 and 206) updates the transformed models and then updates training models.

The non-Gaussian models 202 cannot be trained directly. Once the objective function is transformed (203) and the models are transformed (204), the transformed models can be used to directly solve the transformed objective. The solution from the transformed objective provides updated transformed models (205). The updated transformed models are then used to compute and update the training models 206.

Figure 3:
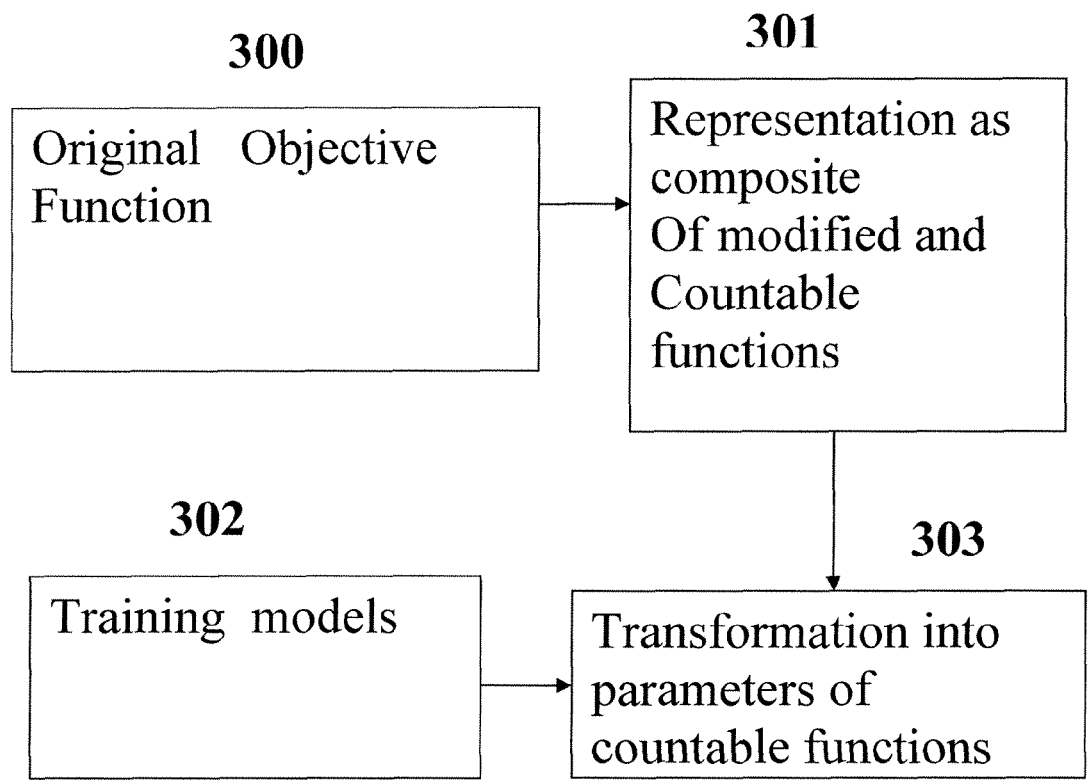
FIG. 3 more specifically illustrates the transformation of the objective function and the transformation of training models of the exemplary, non-limiting embodiment of the present invention illustrated in FIGS. 1 and 2.

FIG. 3 illustrates a further explanation of the transformation of the objective function and the transformation of the training models (from 203 and 204 in FIG. 2). An original objective function 300 (which corresponds to 201 in FIG. 2) is represented as a composition of modified functions and countable functions 301. The original training models 302 (which correspond to 202 in FIG. 2) are transformed into parameters of countable functions.

Figure 4:
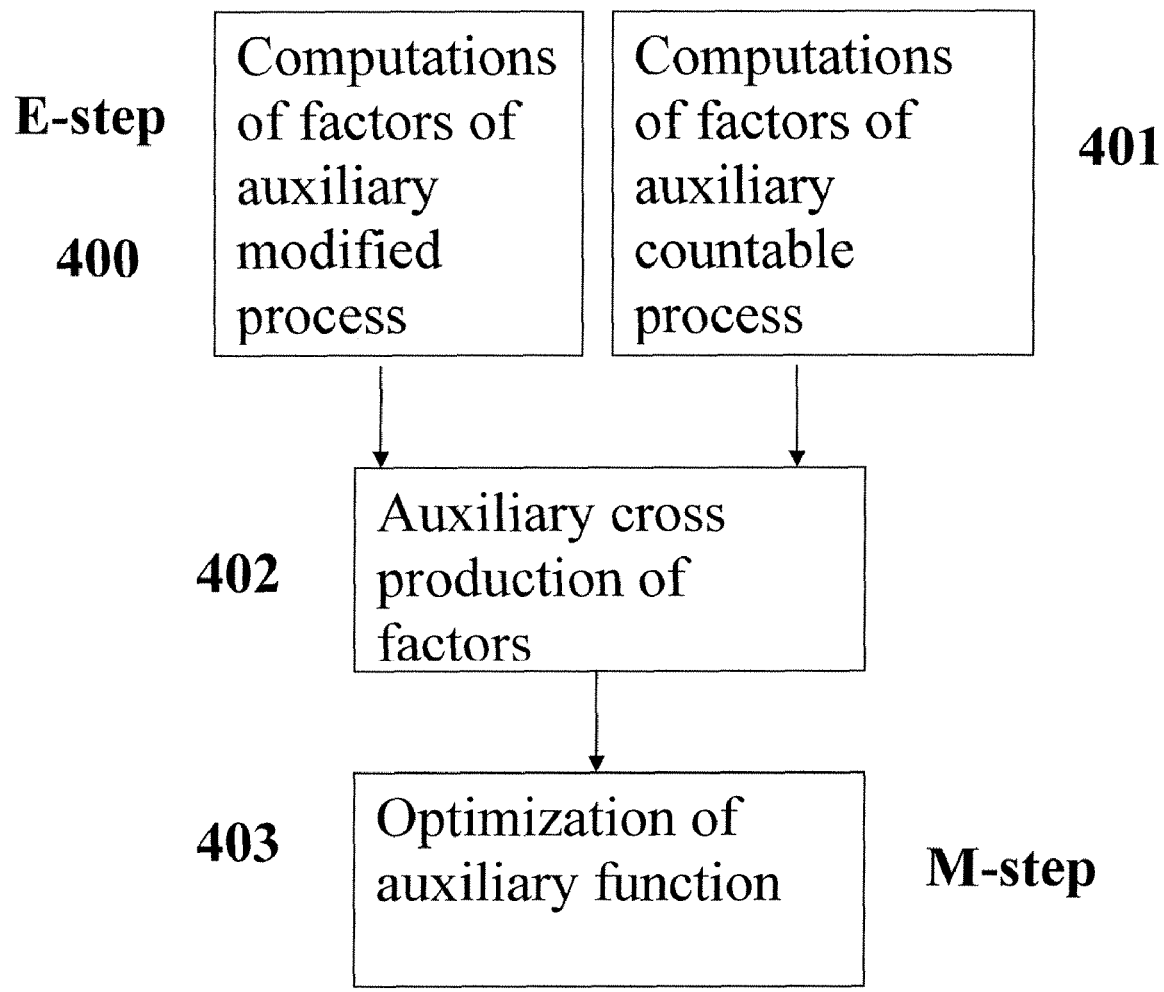
FIG. 4 more specifically illustrates updating of transformed models of the exemplary, non-limiting embodiment of the present invention illustrated in FIGS. 1 and 2.

FIG. 4 illustrates a further explanation of the updating of the transformed models (205 in FIG. 2). The updating of the transformed models includes an expectation (E)-step and a maximization (M)-step. As explained with reference to FIG. 3, the original objective function 300 is a composition of modified and countable functions. In the expectation step, factors of the modified function are computed 400 and factors of the countable function are computed 401. These factors are combined as a cross product 402. This provides the auxiliary function that can be efficiently optimized in 403 (the maximization (M)-step).

Figure 5:
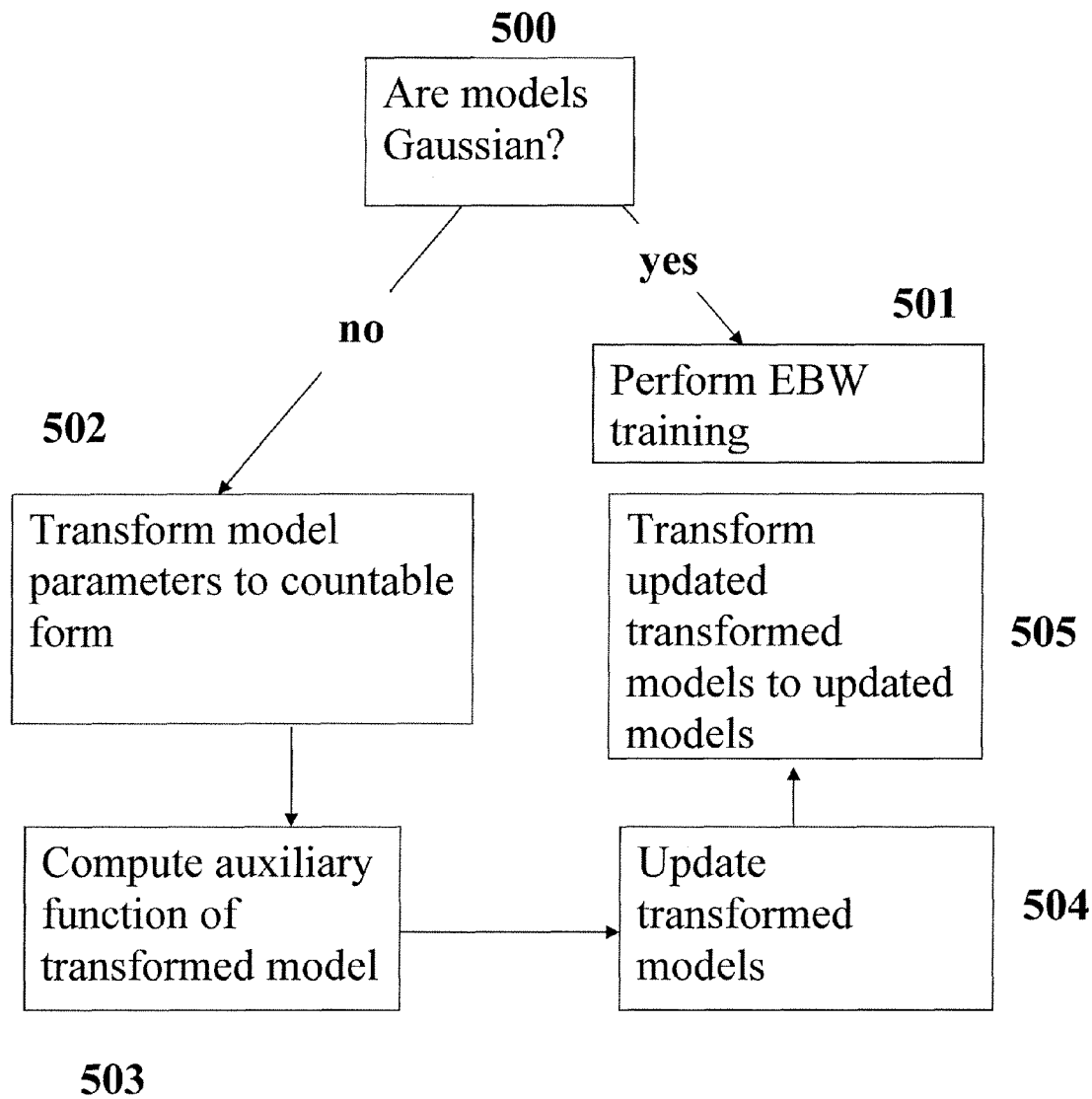
FIG. 5 illustrates an overview of the method (and system) for optimizing a function of a parameter according to an exemplary, non-limiting embodiment of the present invention.

The method (system) should determine if the optimization problem operates with Gaussian models (500). This determination procedure is illustrated in FIG. 5. If Gaussian, then the method applies a standard EBW optimization process 501. If not Gaussian, then the method (system) transforms model parameters to a countable form 502. Then, the method (system) computes an auxiliary function of the transformed model 503. Then, the transformed models are updated 504. Finally, the transformed models are updated to updated models 505.

Figure 6:
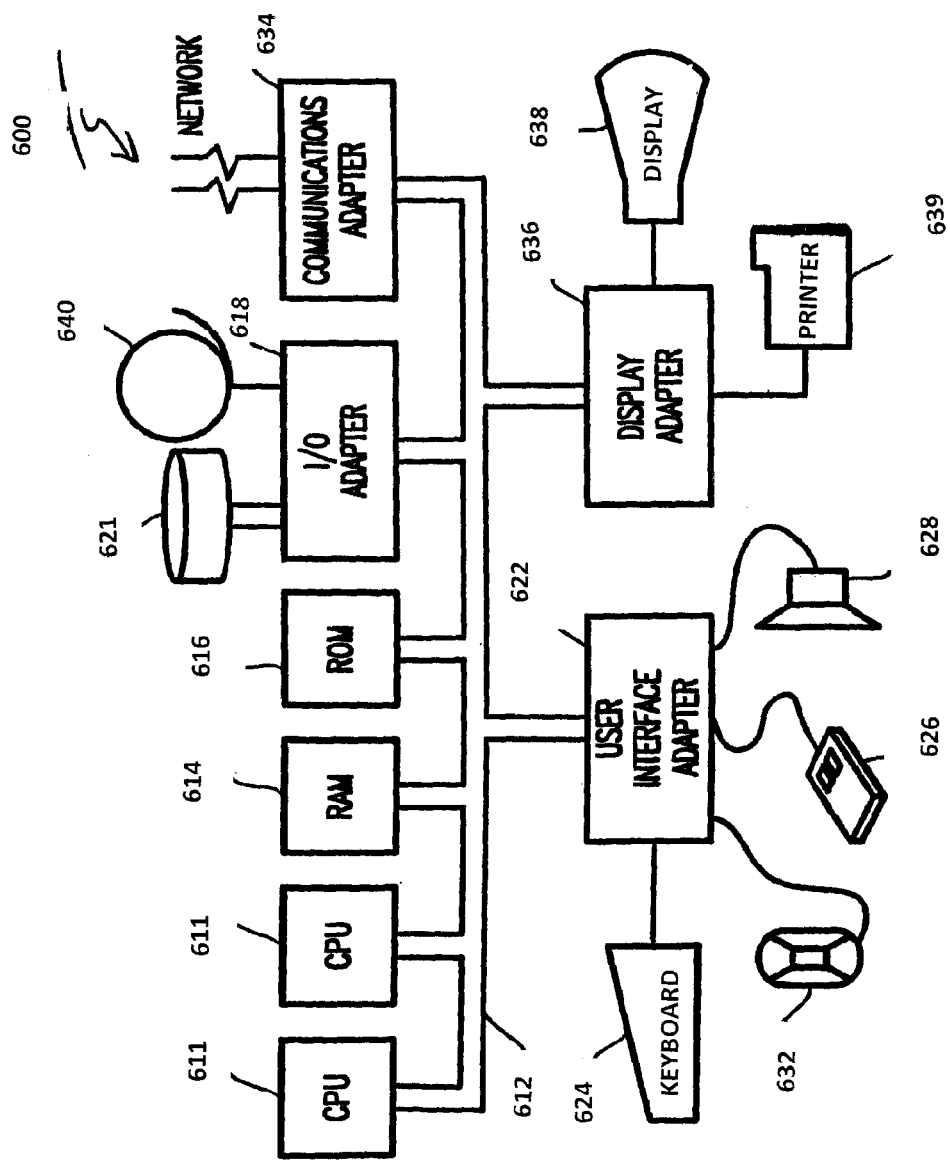
FIG. 6 illustrates an exemplary hardware/information handling system 600 for incorporating the present invention therein.
Figure 7:
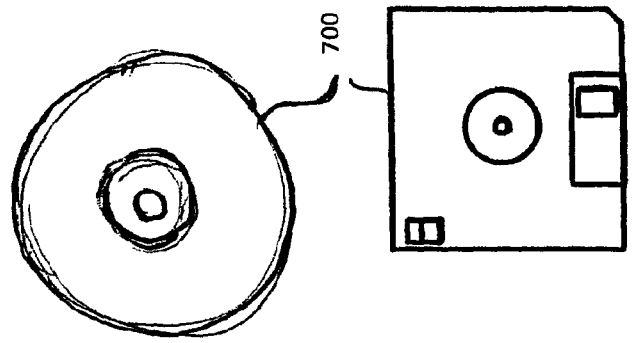
FIG. 7 illustrates a signal bearing medium 700 (e.g., storage medium) for storing steps of a program of a method according to the present invention.

FIG. 6 illustrates a typical hardware configuration of an information handling/computer system in accordance with the invention and which preferably has at least one processor or central processing unit (CPU) 611.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable (e.g., computer-readable) instructions. These instructions may reside in various types of signal-bearing (e.g., computer-readable) media.

Thus, this aspect of the present invention is directed to a programmed product, comprising signal-bearing (e.g., computer-readable) media tangibly embodying a program of machine-readable (e.g., computer-readable) instructions executable by a digital data processor incorporating the CPU 611 and hardware above, to perform the method of the invention.

This signal-bearing (e.g., computer-readable) media may include, for example, a RAM contained within the CPU 611, as represented by the fast-access storage for example. Alternatively, the instructions may be contained in another signal-bearing (e.g., computer-readable) media, such as a magnetic data storage diskette 700 (FIG. 7), directly or indirectly accessible by the CPU 611. Whether contained in the diskette 700, the computer/CPU 611, or elsewhere, the instructions may be stored on a variety of machine-readable (e.g., computer-readable) data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing (e.g., computer-readable) media. Alternatively, other suitable signal-bearing media may include transmission media such as digital and analog and communication links and wireless.

In an illustrative embodiment of the invention, the machine-readable (e.g., computer-readable) instructions may comprise software object code.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method comprising:
    inputting training data, the training data comprising data for pattern recognition processing;
    training an initial objective function having non-Gaussian parameters, the training comprising transforming the initial objective function into, an auxiliary function of parameters that is optimizable computationally more efficiently than the initial objective function;
    obtaining parameters that are optimum for the auxiliary function;
    obtaining updated parameters by taking a weighted sum of the optimum parameters of the auxiliary function and initial model parameters; and
    providing the updated parameters to a pattern recognition system.

2. The method according to claim 1, wherein the auxiliary function comprises a sum of units that are represented as a composition of modified factors and functional factors.

3. The method according to claim 2, further comprising transforming said functional factors into countable factors.

4. The method according to claim 2, wherein said countable factors are represented as quasi-Gaussian factors.

5. The method according to claim 4, further comprising training the function of the parameter when the function is Gaussian.

6. The method according to claim 2, wherein said countable factors are represented as polynomials of parameters.

7. The method according to claim 2, further comprising:
    setting the updated model parameters as initial parameters; and
    repeating said associating, said obtaining parameters, and said obtaining updated parameters.

8. The method according to claim 1, further comprising determining whether the function of the parameter is Gaussian.

9. The method according to claim 8, further comprising training functional factors into quasi-Gaussian factors if the functional factors are not Gaussian.

10. A system comprising:
    an input unit configured to input training data, the training data comprising data for pattern recognition processing;
    a computer processor comprising:
        a training unit configured to train an initial objective function having non-Gaussian parameters, wherein the training comprising transforming the initial objective function into, an auxiliary function of parameters comprising a composition of modified factors and countable factors; and
        a unit configured to obtain parameters that are optimum for the auxiliary function; and
        a unit configured to obtain updated parameters by taking a weighted sum of the optimum parameters of the auxiliary function and initial model parameters; and
    a pattern recognition system configured to receive the updated parameters.

11. The system according to claim 10, wherein said countable factors are represented as quasi-Gaussian factors.

12. The system according to claim 11, further comprising a transformation unit for transforming the quasi-Gaussian factors.

13. The system according to claim 12, wherein training unit that trains the function of the parameter when the function is Gaussian.

14. The system according to claim 10, further comprising a determination unit that determines whether the function of the parameter is Gaussian.

15. The system according to claim 10, further comprising a computation unit that computes a function of the composition of modified factors and countable factors.

16. A non-transitory computer-readable storage medium embodying a program of computer-readable instructions executable by a digital processing apparatus to perform a method of optimizing a function of a parameter, said method comprising:
    inputting training data, the training data comprising data for pattern recognition processing;

training an initial objective function having non-Gaussian parameters, the training comprising transforming the initial objective function into, an auxiliary function of parameters that is optimizable computationally more efficiently than the initial objective function;

obtaining parameters that are optimum for the auxiliary function;

obtaining updated parameters by taking a weighted sum of the optimum parameters of the auxiliary function and initial model parameters; and providing the updated parameters to a pattern recognition system.

\* \* \* \* \*